(12) United States Patent
Cho et al.

(10) Patent No.: US 7,691,021 B2
(45) Date of Patent: Apr. 6, 2010

(54) POWER TRAIN FOR HYBRID ELECTRIC VEHICLES AND METHOD OF CONTROLLING THE SAME

(75) Inventors: Sung-Tae Cho, Gunpo-si (KR); Jang-Moo Lee, Seongnam-si (KR); Ho-Rim Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 571 days.

(21) Appl. No.: 11/633,602

(22) Filed: Dec. 4, 2006

(65) Prior Publication Data

US 2007/0287564 A1 Dec. 13, 2007

(30) Foreign Application Priority Data

Jun. 9, 2006 (KR) .................. 10-2006-0051862
Jun. 26, 2006 (KR) .................. 10-2006-0057419

(51) Int. Cl.
*F16H 3/72* (2006.01)
(52) U.S. Cl. .......................................... 475/5
(58) Field of Classification Search ............ 475/5
See application file for complete search history.

(56) References Cited

U.S. PATENT DOCUMENTS

| 7,214,154 | B2 * | 5/2007 | Klemen et al. | 475/5 |
| 7,220,202 | B2 * | 5/2007 | Singh et al. | 475/5 |
| 7,481,733 | B2 * | 1/2009 | Cho et al. | 475/5 |

FOREIGN PATENT DOCUMENTS

| JP | 11-301291 | 11/1999 |
| JP | 11-321357 | 11/1999 |
| JP | 2004-003549 | 1/2004 |
| JP | 2005-067319 | 3/2005 |
| JP | 2005-138802 | 6/2005 |
| JP | 2005-170227 | 6/2005 |

\* cited by examiner

*Primary Examiner*—Ha D. Ho
(74) *Attorney, Agent, or Firm*—Morgan, Lewis & Bockius LLP

(57) ABSTRACT

A power train having dual modes for hybrid vehicles increases the range of the transmission gear ratio within which the efficiency of the power train is superior. The method of operating the power train varies depending on the transmission gear ratio, and thus the power train can be operated with superior efficiency.

7 Claims, 12 Drawing Sheets transmission gear ratio = $\dfrac{V_I}{V_0} = \dfrac{1}{0.714} = 1.4$ ← M1-1 transmission gear ratio = $\dfrac{V_I}{V_0} = \dfrac{1}{0.714} = 1.4$ ← M2-1

$$\text{transmission gear ratio} = \frac{V_I}{V_o} = \frac{1}{0.429} = 2.331 \longleftarrow M1\text{-}2$$

$$\text{transmission gear ratio} = \frac{V_I}{V_o} = \frac{1}{0.75} = 1.333 \longleftarrow M1\text{-}1$$

POWER TRAIN FOR HYBRID ELECTRIC VEHICLES AND METHOD OF CONTROLLING THE SAME

CROSS-REFERENCE TO RELATED APPLICATIONS

The present application is based on, and claims priority from, Korean Applications Serial Number 10-2006-0057419, filed on Jun. 26, 2006 and 10-2006-0051862, filed on Jun. 9, 2006, the disclosures of which are hereby incorporated by reference herein in its entirety.

FIELD OF THE INVENTION

The present invention relates to a power train having dual modes for hybrid electric vehicles and to a method of controlling the power train and, more particularly, to a technique in which the method of operating the power train depends on the transmission gear ratio of the vehicle, thus transmitting power more efficiently.

BACKGROUND OF THE INVENTION

As well known to those skilled in the art, a hybrid power transmission device using two planetary gear sets and two motor generators controls the speed of the motor generators without a separate transmission and thus is able to serve as a variable transmission that is electrically operated. Furthermore, the hybrid power transmission device can operate in a motor mode, an engine mode, a hybrid mode and a regenerative braking mode through control of the speed of the motor generators. If desired, the hybrid power transmission device can turn the engine on or off, thus increasing the fuel consumption ratio. In addition, when braking, the hybrid power transmission device minimizes the use of a frictional brake and thus increases the efficiency of power recovery when braking.

An input split type power train, in which one of two motor generators is directly fixed to an output shaft, is a representative example of conventional power trains using two motor generators for hybrid electric vehicles.

The conventional input split type power train having the above-mentioned construction exhibits the highest efficiency at a transmission gear ratio which forms a mechanical point at which the speed of the other motor generator, which is not coupled to the output shaft, becomes zero. On the basis of the mechanical point, as the transmission gear ratio is increased or reduced, the efficiency of the power train is reduced. The reduction in efficiency of the power train when the transmission gear ratio is reduced is marked, compared to when the transmission gear ratio is increased.

In other words, the conventional power train is problematic in that, as the transmission gear ratio is reduced after passing the mechanical point (as the speed of the vehicle increases), the efficiency of the power train rapidly decreases.

SUMMARY OF THE INVENTION

Embodiments of the present invention provide a power train for hybrid vehicles and a method of controlling the power train which increase the range of the transmission gear ratio in which the efficiency of the power train is superior, so that the power train can maintain relatively high efficiency even though the transmission gear ratio varies.

A power train having dual modes for hybrid electric vehicles according to an exemplary embodiment of the present invention includes an engine and first planetary gear set includes a first ring gear coupled to the engine. A first motor generator is coupled to a sun gear of the first planetary gear set. A second planetary gear set is provided. A first clutch couples or decouples the first sun gear of the first planetary gear set to or from a second sun gear of the second planetary gear set. A second clutch converts the second sun gear of the second planetary gear set between a stationary state and a rotatable state. A second motor generator is provided. A first carrier of the first planetary gear set is coupled to a drive wheel through one operational element of the second planetary gear set. The second motor generator is coupled to another operational element of the second planetary gear set.

To control the power train, in the case where the first carrier of the first planetary gear set is coupled to the drive wheel through a second carrier of the second planetary gear set, and the second motor generator is coupled to a second ring gear of the second planetary gear set, relative to the mechanical point at which the speed of the first motor generator is zero, in a high transmission gear ratio region, the first clutch is disengaged and the second clutch is engaged, and, in a low transmission gear ratio region, the first clutch is engaged and the second clutch is disengaged.

In the case where the first carrier of the first planetary gear set is coupled to the drive wheel through the second ring gear of the second planetary gear set and the second motor generator is coupled to the second carrier of the second planetary gear set, relative to the mechanical point at which the speed of the first motor generator is zero, in a high transmission gear ratio region, the first clutch is engaged and the second clutch is disengaged, and, in a low transmission gear ratio region, the first clutch is disengaged and the second clutch is engaged.

In a further embodiment of the present invention, a method for controlling the power train is applied to a hybrid electric vehicle having a transmission with at least two clutches and at least one electric motor generator, wherein the clutches control cooperation of planetary gear sets with the electric motor generator. The method thus includes steps of disengaging one clutch and engaging the other clutch when motor generator speed is zero in a high transmission gear ratio, and engaging the one clutch and disengaging the other clutch when the speed is zero in a low transmission gear ratio.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, exemplary embodiments of the present invention will be described in detail with reference to the attached drawings.

Figure 1:
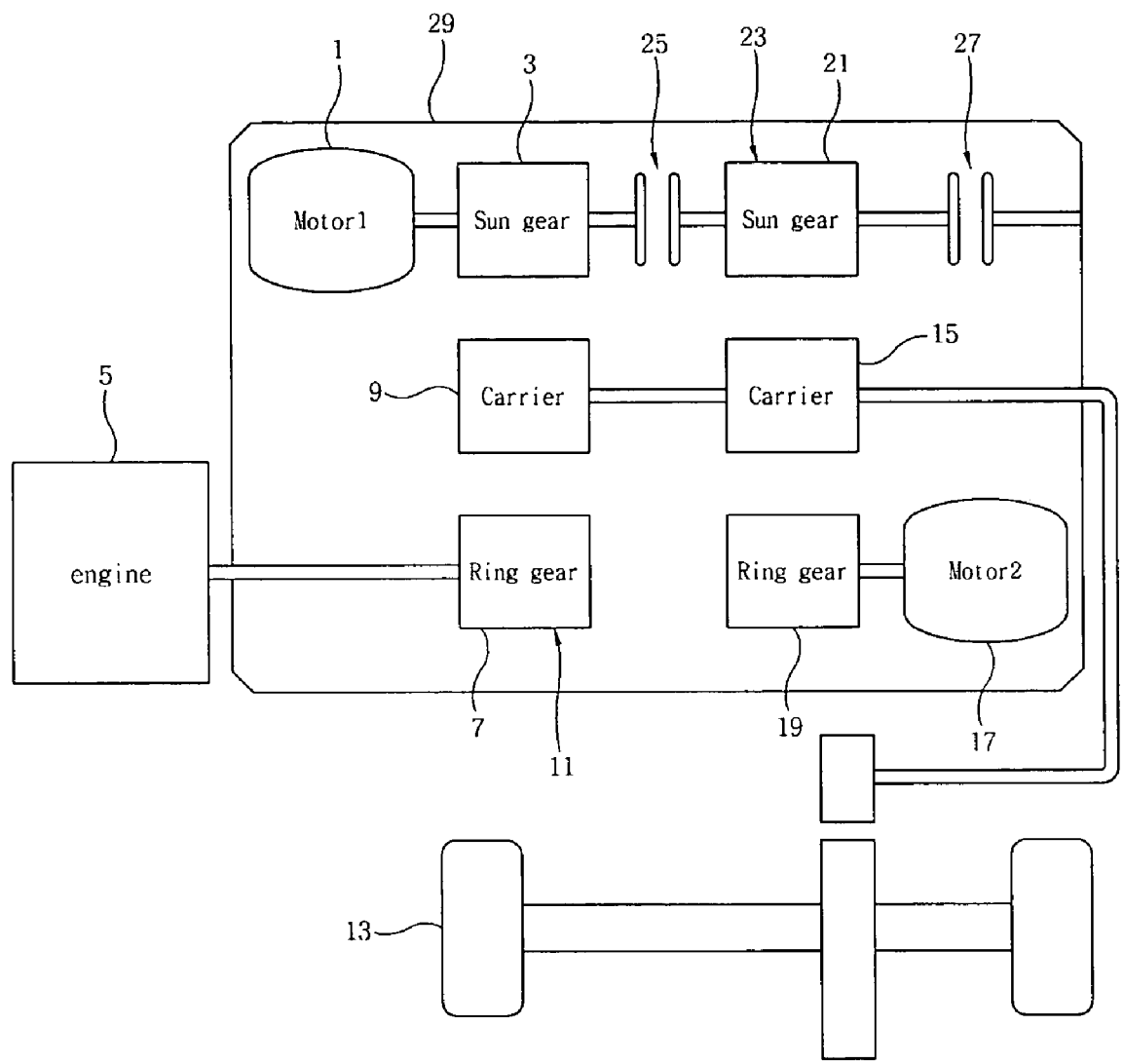
FIG. 1 is a schematic diagram showing a power train having dual modes for hybrid electric vehicles, according to a first embodiment of the present invention.

Referring to FIG. 1, a power train according to a first embodiment of the present invention includes a first planetary gear set 11, a second planetary gear set 23, a first clutch 25 and a second clutch 25. The first planetary gear set 11 includes a first sun gear 3 coupled to a first motor generator 1, a first ring gear 7 coupled to an engine 5, and a first carrier 11. The second planetary gear set 23 includes a second carrier 15, which is coupled both to the first carrier 9 and to a drive wheel 13, a second ring gear 19 coupled to a second motor generator 17, and a second sun gear 21. The first clutch 25 couples or decouples the first sun gear 3 to or from the second sun gear 21. The second clutch 27 converts the second sun gear 21 between a stationary state and a rotatable state.

The first carrier 9 of the first planetary gear set 11 is coupled to the drive wheel 13 through the second carrier 15 of the second planetary gear set 23. The second motor generator 17 is coupled to the second ring gear 19 of the second planetary gear set 23.

In this embodiment, the second clutch 27 is provided between a power train case 29 and the second sun gear 21 of the second planetary gear set 23 to convert the second sun gear 21 between a stationary state and a rotatable state relative to the power train case 29. The second clutch 27 may be provided between the second sun gear 21 and a separate vehicle body part other than the power train case 29. Each of the first planetary gear set 11 and the second planetary gear set 23 comprises a single pinion planetary gear.

The power train having the above-mentioned construction is operated in a first mode, which is an input split mode, or in a second mode, which is an output split mode, depending on the states of the first and second clutches 25 and 27.

Figure 2:
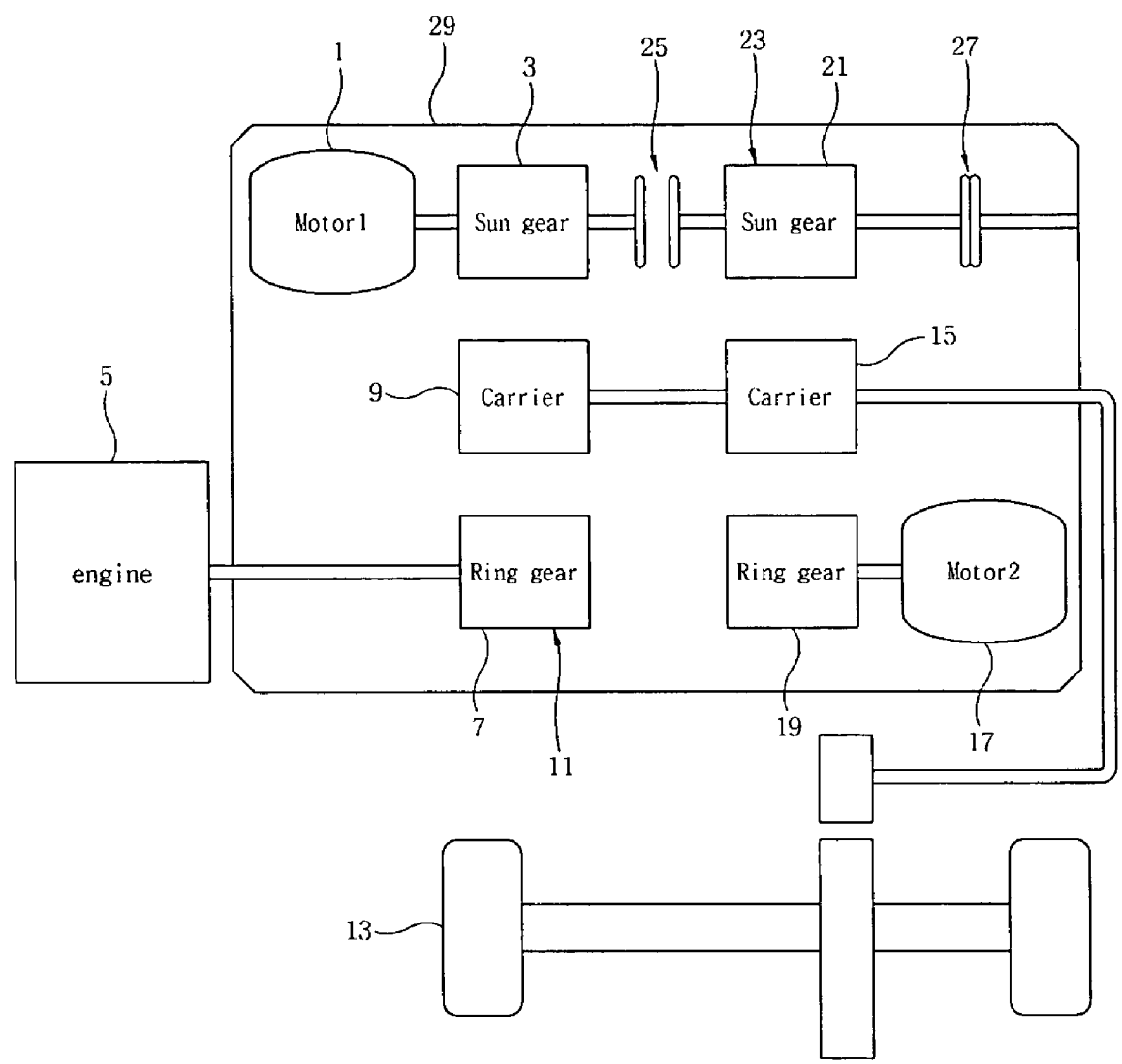
FIG. 2 is a schematic diagram showing the power train of FIG. 1, which is operated in a first mode.
Figure 3:
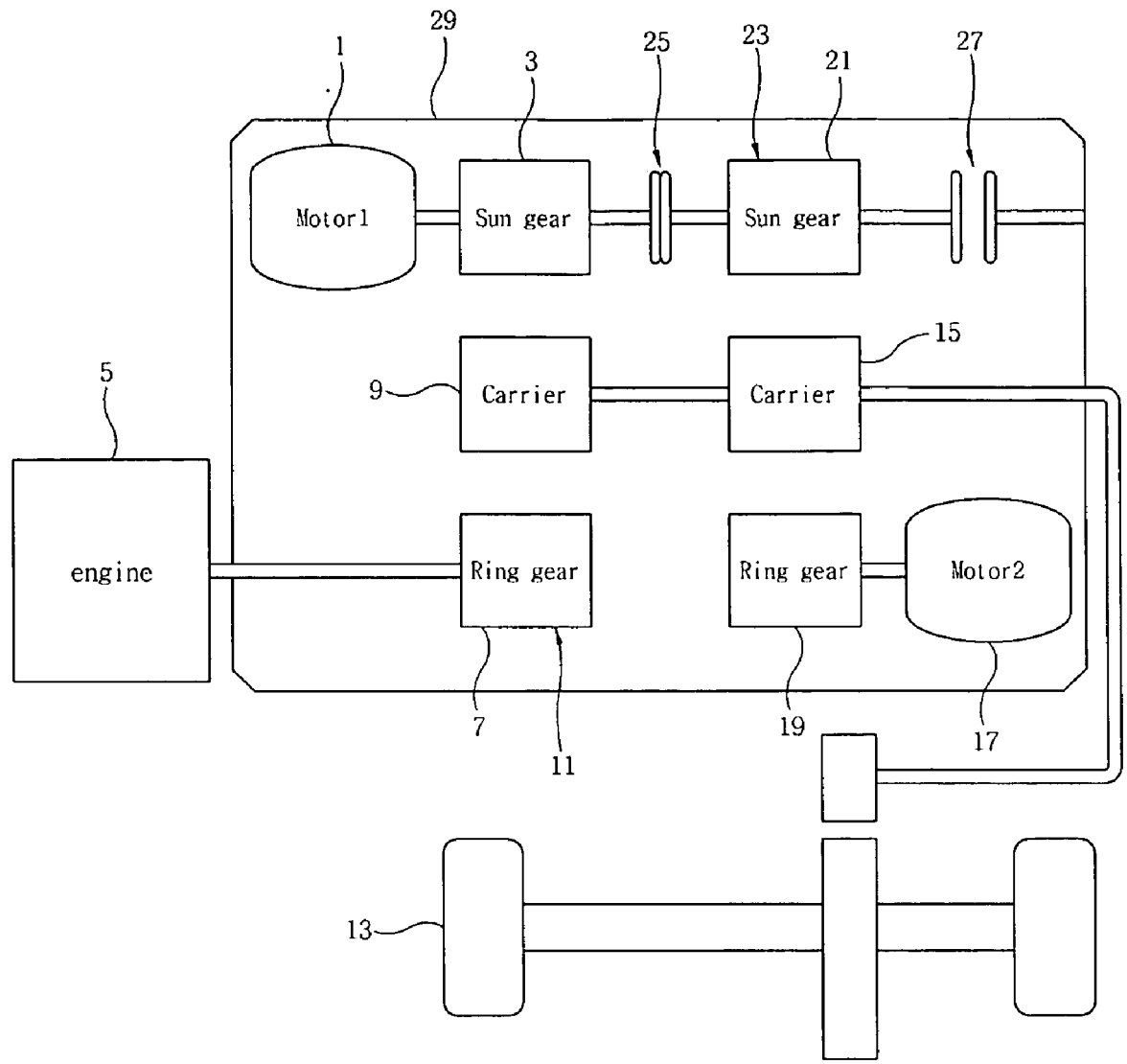
FIG. 3 is a schematic diagram showing the power train of FIG. 1, which is operated in a second mode.

Hereinafter, the case of FIG. 2, in which the first clutch 25 is in a disengaged state while the second clutch 27 is in a engaged state, will be called the first mode, and the case of FIG. 3, in which the first clutch 25 is in a engaged state while the second clutch 27 is in a disengaged state, will be called the second mode.

Figure 4:
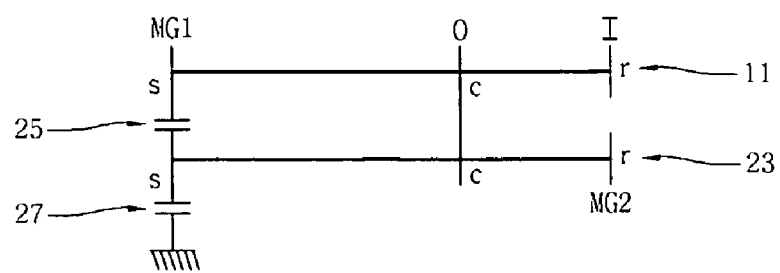
FIG. 4 is a lever analysis diagram of the power train of FIG. 1.
Figure 5:
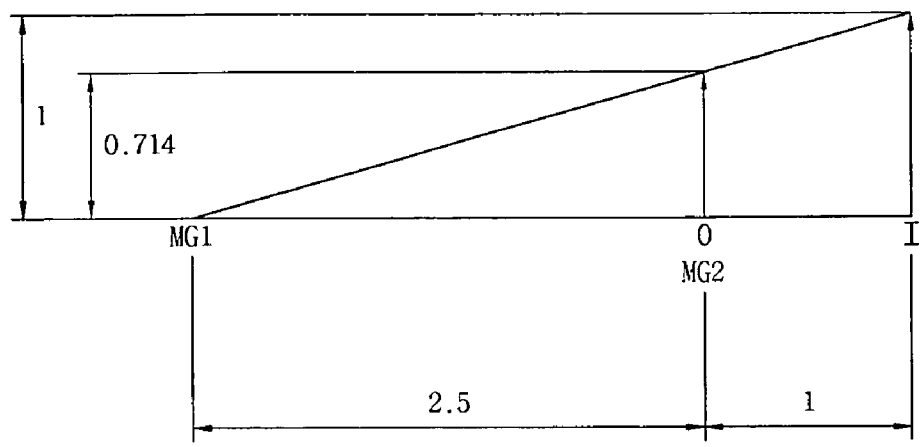
FIG. 5 is a lever analysis diagram showing the formation of a mechanical point in the first mode of the power train according to the an embodiment of the present invention.

FIG. 4 is a lever analysis diagram of the power train of the first embodiment. FIG. 5 is a lever analysis diagram showing one state of the power train being operated in the first mode. FIG. 5 illustrates a transmission gear ratio that forms a mechanical point M1-1 at which the speed of the first motor generator 1 is zero. In this mode, when the speed of the second motor generator 17 is zero, the output is zero, which has no meaning, therefore further explanation and illustration are deemed unnecessary.

In the case where the power train of the present invention is in the first mode, the one mechanical point M1-1 shown in FIG. 5 is attained while the transmission gear ratio is varied. On the suppositions that no battery is provided between the first motor generator 1 and the second motor generator 17, that electricity that is generated at one side is completely consumed by the other side, so that the sum of the generated and wasted amounts is zero, and that energy loss for maintaining the speed of the motor generator at zero is negligible, the efficiency of the power train becomes 1, which is the maximum value, at the mechanical point. This is confirmed in the graph of FIG. 7, which illustrates the efficiency of the power train depending on variation in the transmission gear ratio.

Figure 7:
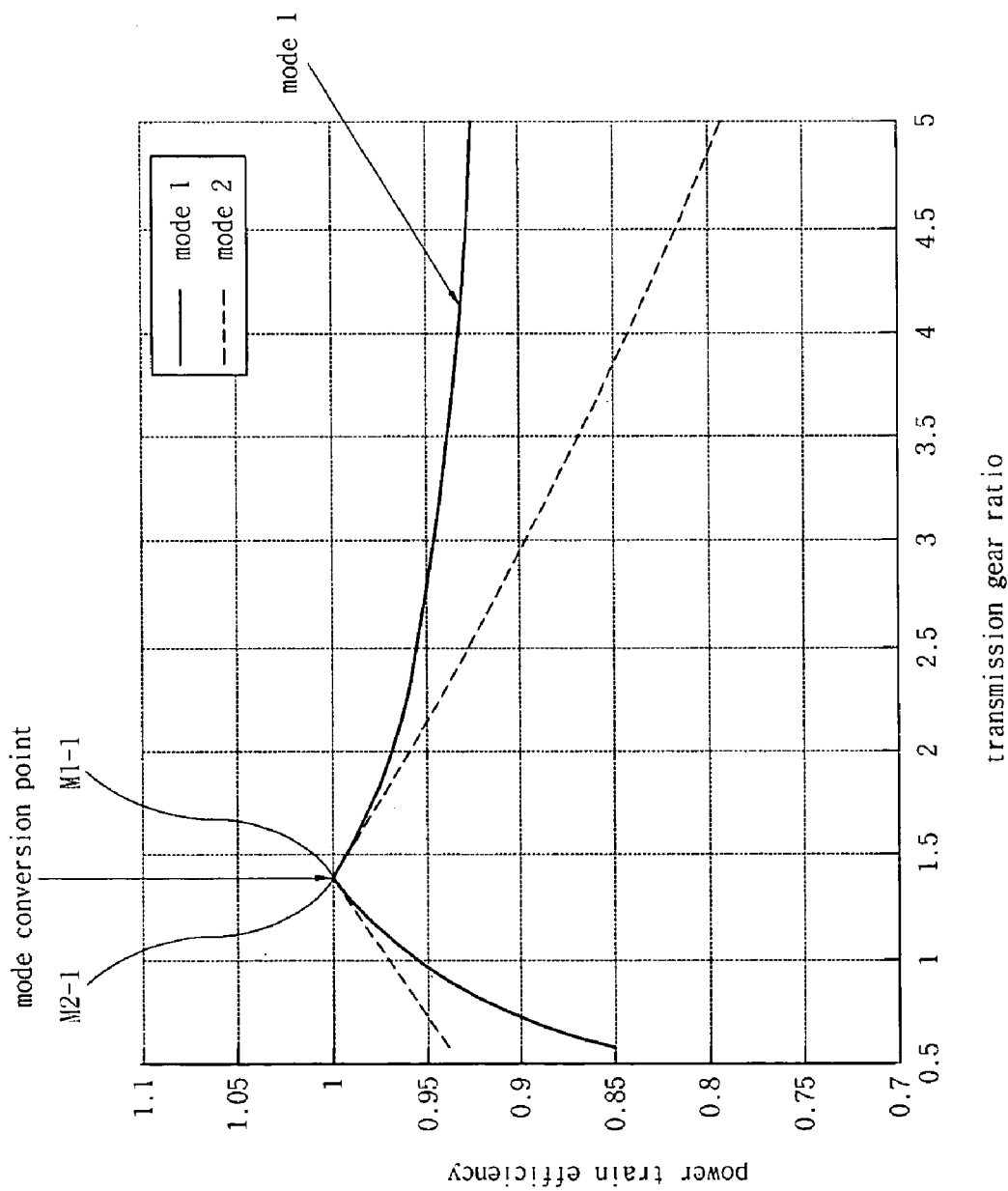
FIG. 7 is a graph showing the efficiency of the power train as a function of a transmission gear ratio according to a method of controlling the power train of a first embodiment.

Referring to FIG. 7, it can be seen that the line that shows the efficiency in the first mode attains the maximum efficiency value of "1" once. Furthermore, it can be seen that the position at which the efficiency of the power train is maximum is only the mechanical point M1-1 of the power train in the first mode. As well, it can be seen that the efficiency in the first mode is higher than in the second mode, which will be explained later herein, in the right region relative to the position designated as a mode conversion point, while the efficiency in the first mode is lower than in the second mode in the left region relative to the mode conversion point.

Figure 6:
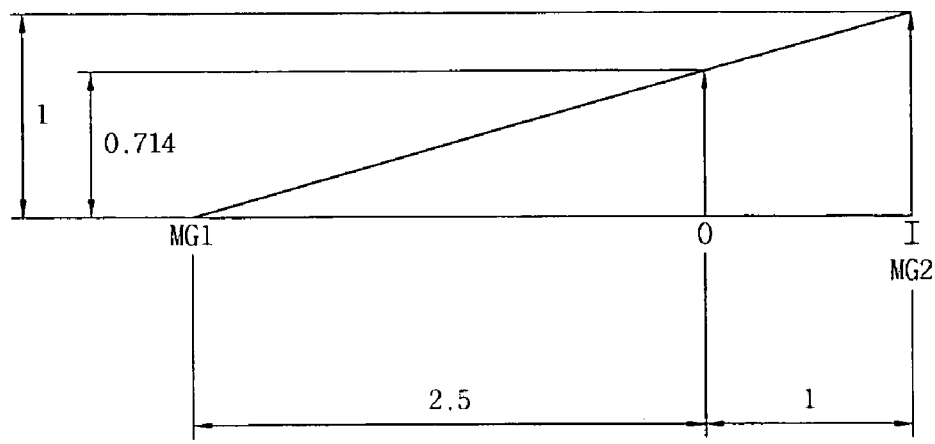
FIG. 6 is a lever analysis diagram showing the formation of a mechanical point in the second mode of the power train according to the an embodiment of the present invention.

For reference, in FIGS. 5 and 6, the character O denotes output, I denotes input (engine), MG1 denotes the first motor generator, and MG2 denotes the second motor generator. I is spaced apart from O by a distance of 1.

When a distance from O to MG1 is $\alpha$ and a distance from O to MG2 is $\beta$, in the case of the first mode, $\alpha=-2.5$ and $\beta=0$. In the case of the second mode, $\alpha=-2.5$ and $\beta=1$. As such, in the first mode, $\beta$ is zero, that is, it is understood that the first mode is the input split mode because the second motor generator 17 is directly coupled to the output shaft. Furthermore, in the second mode, $\beta=1$, that is, it is understood that the second mode is the output split mode because the second motor generator 17 can be regarded as being directly coupled to the input shaft.

Of course, the distances from O to I, MG1 and MG2 correspond to gear ratios in the real power train.

Meanwhile, the graph of FIG. 7 is defined by the following Equation. 1.

$$\mathit{eff} = \left[ -1 + \frac{\eta_a\{(\gamma-1)\alpha+1\} - \eta_b\{(\gamma-1)\beta+1\}}{\alpha\beta(\gamma-1)(\eta_a-\eta_b)+(\eta_a\beta-\eta_b\alpha)} \right] \times \frac{1}{\gamma} \quad \text{[Equation 1]}$$

Here, eff denotes the efficiency of the power train.

$\alpha$ and $\beta$ denote the above-mentioned values depending on the mode.

$\gamma$ denotes the transmission gear ratio.

$\eta_a$ and $\eta_b$ respectively denote efficiencies when the first motor generator 1 and the second motor generator 17 are charged and discharged (consumed). Here, 0.949 and 1/0.954 are used as values of $\eta_a$ and $\eta_b$. That is, when charged, it has a value less than 1 (in this case, 0.949). When discharged, it has a value greater than 1 (in this case, 1/0.954).

FIG. 6 is a lever analysis diagram showing one state of the power train being operated in the second mode. That is, FIG. 6 illustrates a transmission gear ratio that forms a mechanical point M2-1 at which the speed of the first motor generator 1 is zero. In the second mode, when the speed of the second motor generator 17 is zero, the input is zero, which has no meaning, therefore further explanation and illustration are deemed unnecessary.

Therefore, in the second mode, the one mechanical points M2-1 shown in FIG. 6 are attained while the transmission gear ratio is varied. Supposing that no battery is provided between the first motor generator 1 and the second motor generator 17, that electricity that is generated at one side is completely consumed by the other side so that the sum of the generated and wasted amounts is zero, and that energy loss for maintaining the speed of the motor generator at zero is negligible, the efficiency of the power train becomes 1, which is the maximum value, at the mechanical point. This is confirmed in the graph of FIG. 7, which illustrates the efficiency of the power train depending on variation in the transmission gear ratio.

Referring to FIG. 7, it can be seen that the line that shows the efficiency of the power train in the second mode attains the maximum efficiency value of "1" one. Furthermore, it can be seen that the position at which the efficiency of the power train is maximum is only the mechanical point M2-1 of the power train in the second mode. This position, which is the mechanical point M2-1, is the same as the mechanical point M1-1 of the first mode and is the mode conversion point at which the mode of the power train is converted.

Furthermore, it can be seen that the efficiency in the second mode is higher than that of the first mode in the left region relative to the mode conversion point, but is lower than that of the first mode in the right region relative to the mode conversion point.

The mode conversion point corresponds to a transmission gear ratio at which the speed of the first motor generator 1 in the first mode becomes zero, and also corresponds to a transmission gear ratio at which the speed of the first motor generator 1 in the second mode becomes zero.

Therefore, in the present invention, on the basis of the mode conversion point, which is the mechanical point at which the speed of the first motor generator 1 is zero, in the region where the transmission gear ratio is higher, the first clutch 25 is disengaged and the second clutch 27 is engaged such that the power train is operated in the first mode. In the region where the transmission gear ratio is lower, the first clutch 25 is engaged and the second clutch 27 is disengaged such that the power train is operated in the second mode. Thus, the range of the transmission gear ratio in which the efficiency of the power train is superior is increased, so that the power train can maintain a relatively high efficiency even if the transmission gear ratio is varied.

That is, the first mode is used when a relatively high transmission gear ratio of the power train is required because the vehicle is moving at a low speed, and the second mode is used when a relatively low transmission gear ratio of the power train is required because the vehicle is moving at a high speed. In the first mode and the second mode, the first motor generator 1 and the second motor generator 17 alternately conduct charging and discharging depending on the transmission gear ratio. Power generated by the first or second motor generator 1 or 17 is added to power of the engine 5 and transmitted to the drive wheel 13.

Figure 8:
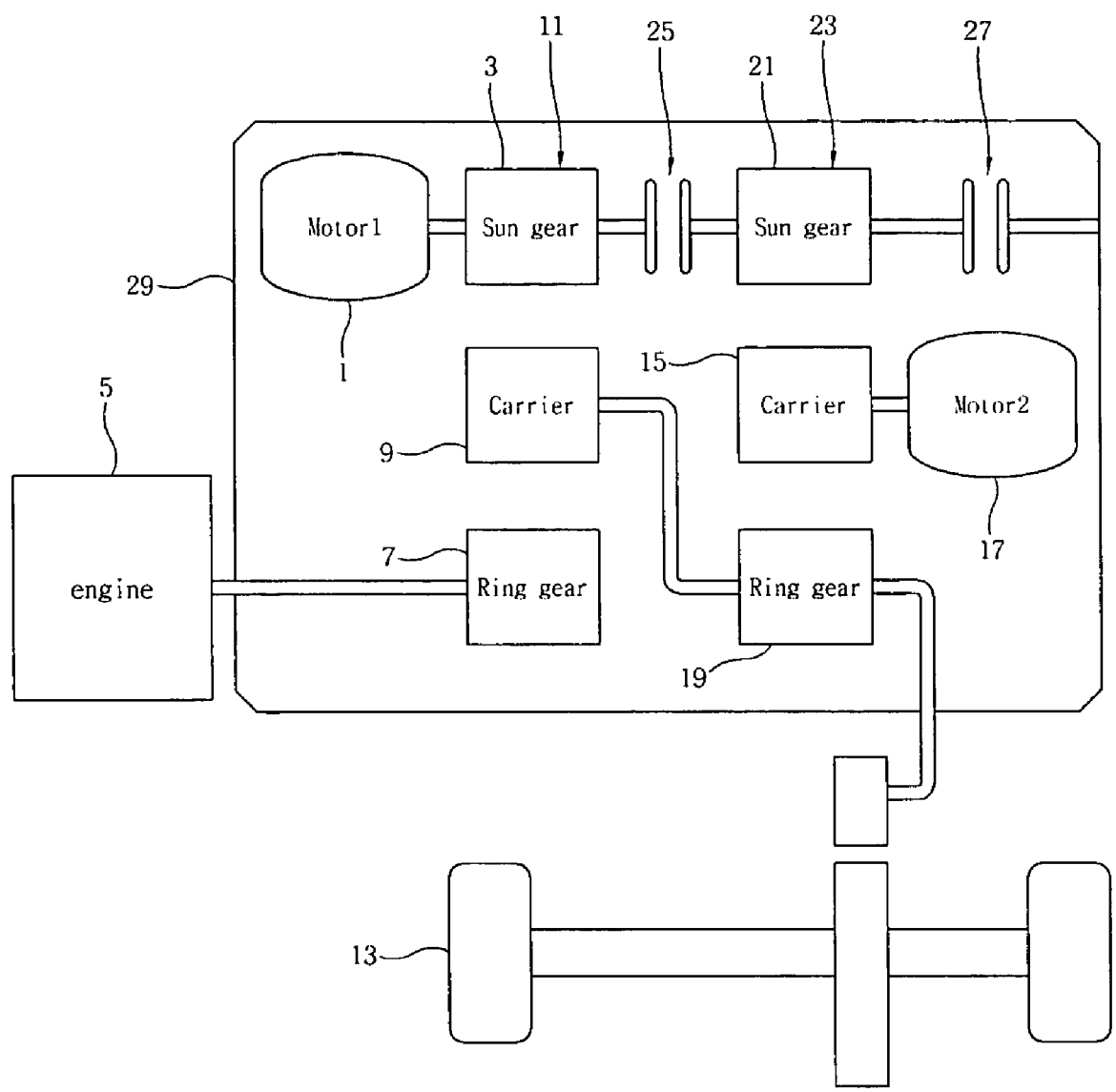
FIG. 8 is a schematic diagram showing a power train having dual modes for hybrid electric vehicles, according to another embodiment of the present invention.

FIGS. 8 through 14 illustrate a second embodiment of the present invention. Referring to FIG. 8, a power train according to the second embodiment of the present invention includes a first planetary gear set 11, a second planetary gear set 23, a first clutch 25 and a second clutch 25. The first planetary gear set 11 includes a first sun gear 3 coupled to a first motor generator 1, a first ring gear 7 coupled to an engine 5, and a first carrier 9. The second planetary gear set 23 includes a second ring gear 19 coupled both to the first carrier 9 and to a drive wheel 13, a second carrier 15 coupled to a second motor generator 17, and a second sun gear 21. The first clutch 25 couples or decouples the first sun gear 3 of the first planetary gear set 11 to or from the second sun gear 21 of the second planetary gear set 23. The second clutch 27 converts the second sun gear 21 between a stationary state and a rotatable state.

The first carrier 9 of the first planetary gear set 11 is coupled to the drive wheel 13 through the second ring gear 19 of the second planetary gear set 23. The second motor generator 17 is coupled to the second carrier 15 of the second planetary gear set 23.

In the second embodiment, the second clutch 27 is provided between a power train case 29 and the second sun gear 21 of the second planetary gear set 23 to convert the second sun gear 21 between a stationary state and a state of being rotatable relative to the power train case 29, in the same manner as that of the first embodiment. The second clutch 27 may be provided between the second sun gear 21 and a separate vehicle body part other than the power train case 29. Each of the first planetary gear set 11 and the second planetary gear set 23 comprises a single pinion planetary gear.

The power train having the above-mentioned construction is operated in a first mode, which is a compound split mode, or in a second mode, which is an input split mode, depending on the states of the first and second clutches 25 and 27.

Figure 9:
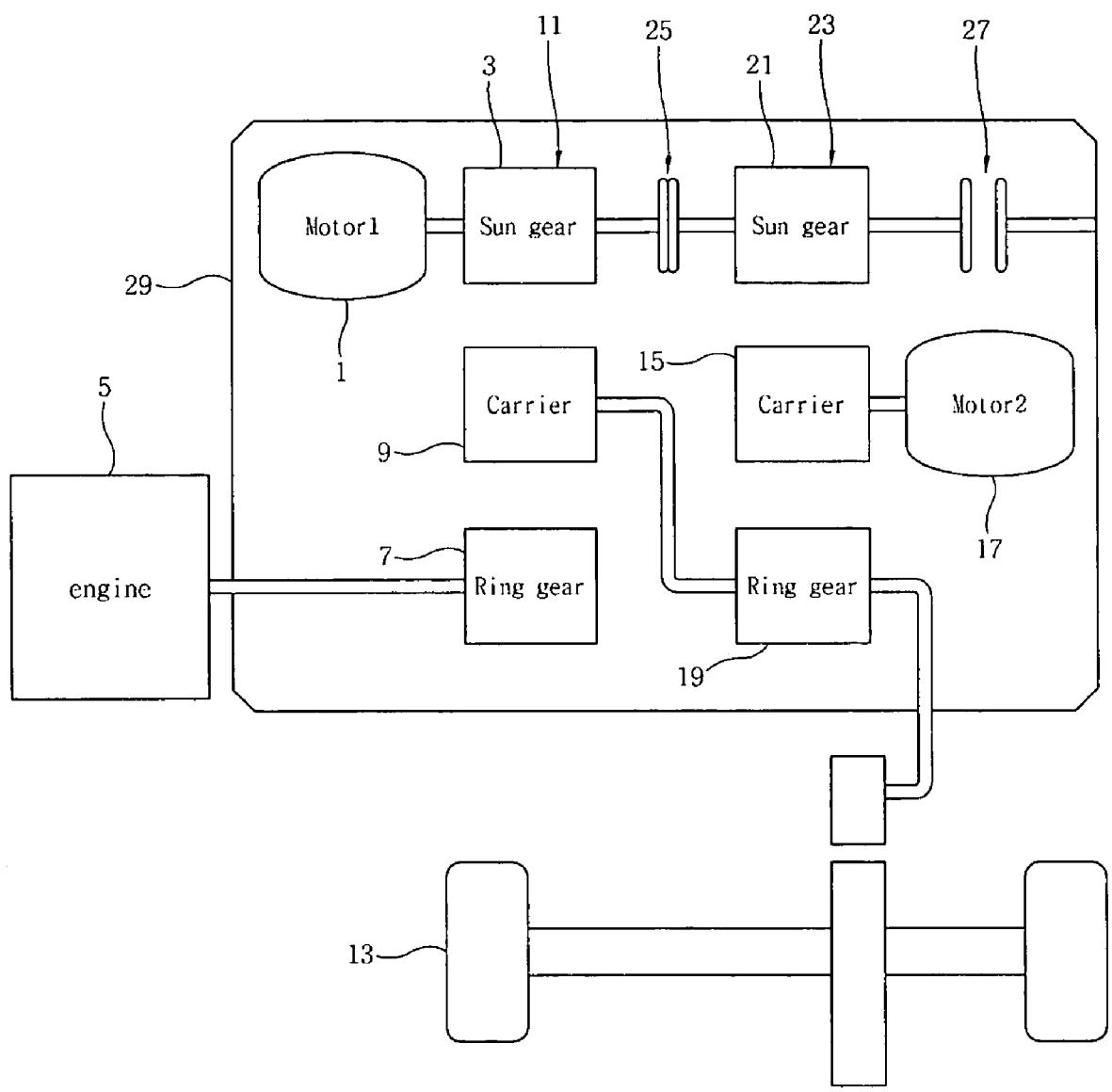
FIG. 9 is a schematic diagram showing the dual power train of FIG. 8 which is operated by a first mode.
Figure 10:
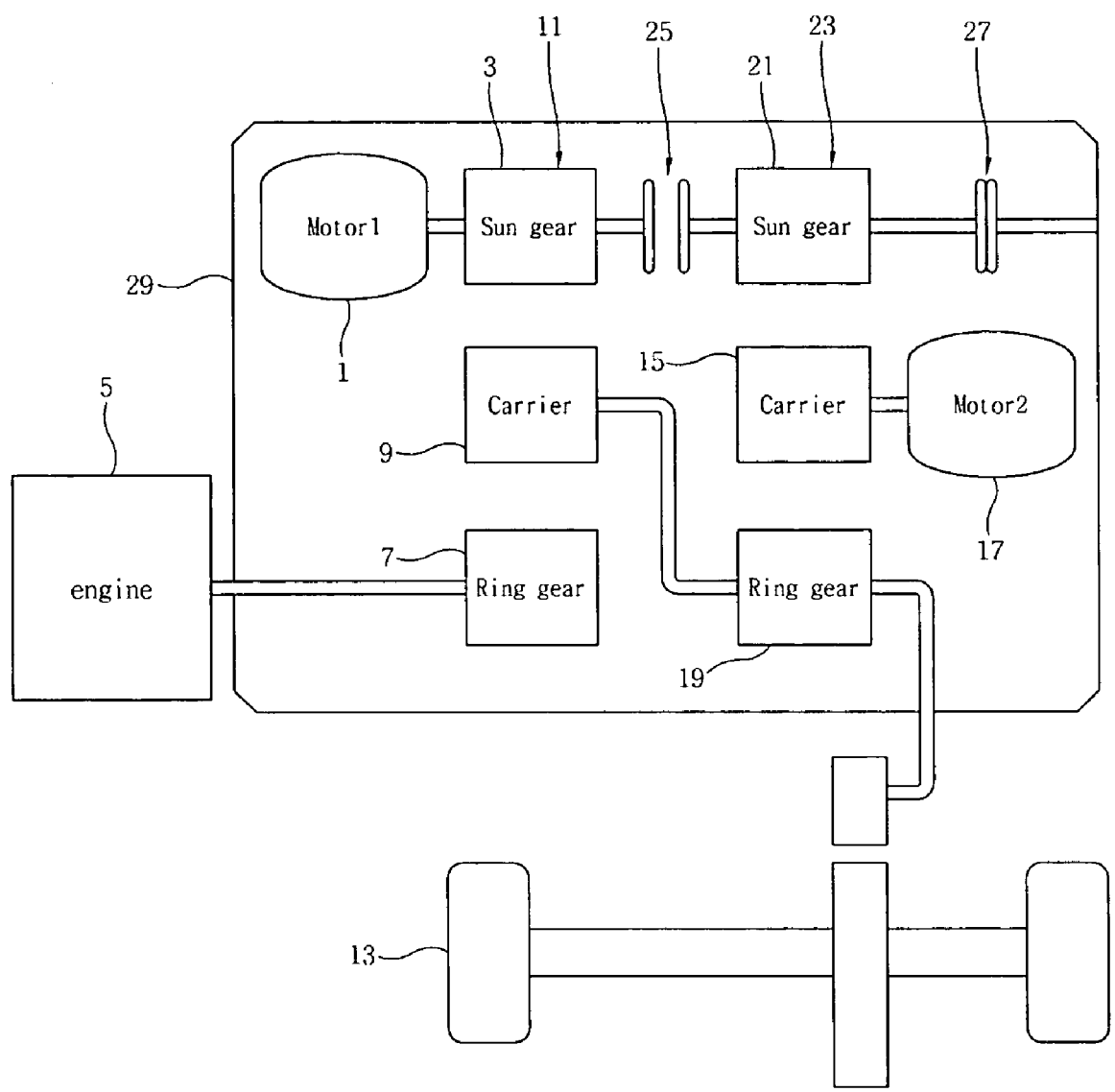
FIG. 10 is a schematic diagram showing the power train of FIG. 8 which is operated by a second mode.

Hereinafter, the case of FIG. 9, in which the first clutch 25 is in a engaged state while the second clutch 27 is in a disengaged state, will be called the first mode, and the case of FIG. 10, in which the first clutch 25 is in a disengaged state while the second clutch 27 is in a engaged state, will be called the second mode.

Figure 11:
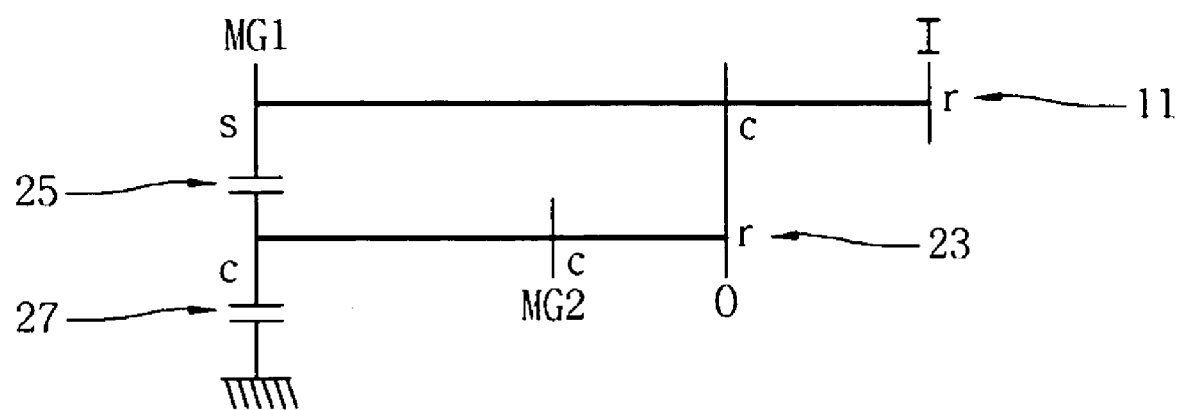
FIG. 11 is a lever analysis diagram of the power train of FIG. 8.
Figure 12:
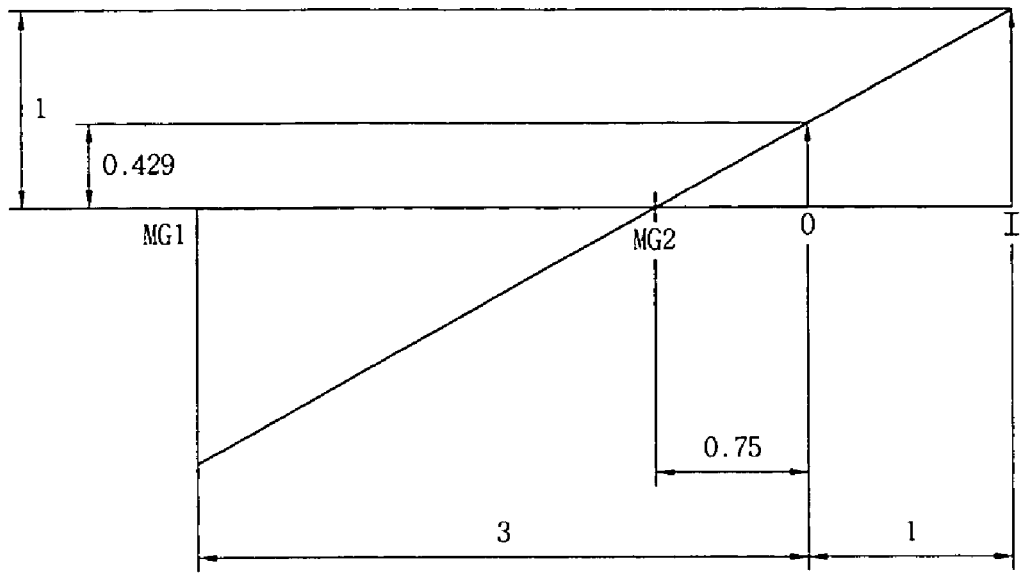
FIG. 12 is a lever analysis diagram showing the formation of mechanical points in the first mode of the power train according to another embodiment of the present invention.
Figure 12:
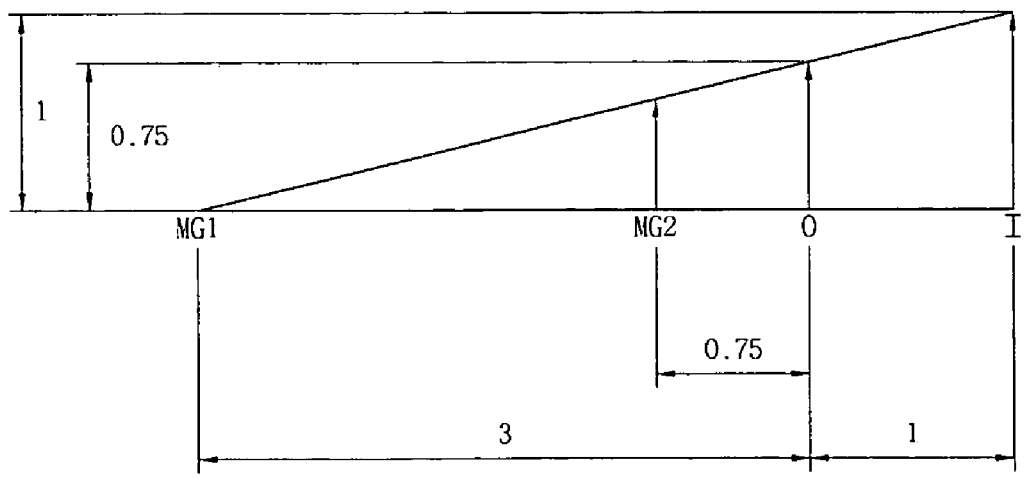

FIG. 11 is a lever analysis diagram of the power train of the second exemplary embodiment. FIG. 12 is a lever analysis diagram of some states of the power train while operated by the first mode. In FIG. 12, the upper view shows a transmission gear ratio that forms a mechanical point M1-2 at which the speed of the second motor generator 17 is zero, and the lower view shows a transmission gear ratio that forms a mechanical point M1-1 at which the speed of the first motor generator 1 is zero.

In the first mode, the two mechanical points M1-1 and M1-2 shown in FIG. 12 are attained while the transmission gear ratio is varied. Supposing that no battery is provided between the first motor generator 1 and the second motor generator 17, that electricity that is generated at one side is completely consumed by the other side so that the sum of the generated and wasted amounts is zero, and that energy loss for maintaining the speed of the motor generator at zero is negligible, the efficiency of the power train becomes 1, which is the maximum value, at the two mechanical points. This is confirmed in the graph of FIG. 14, which illustrates the efficiency of the power train depending on variation in the transmission gear ratio.

Figure 14:
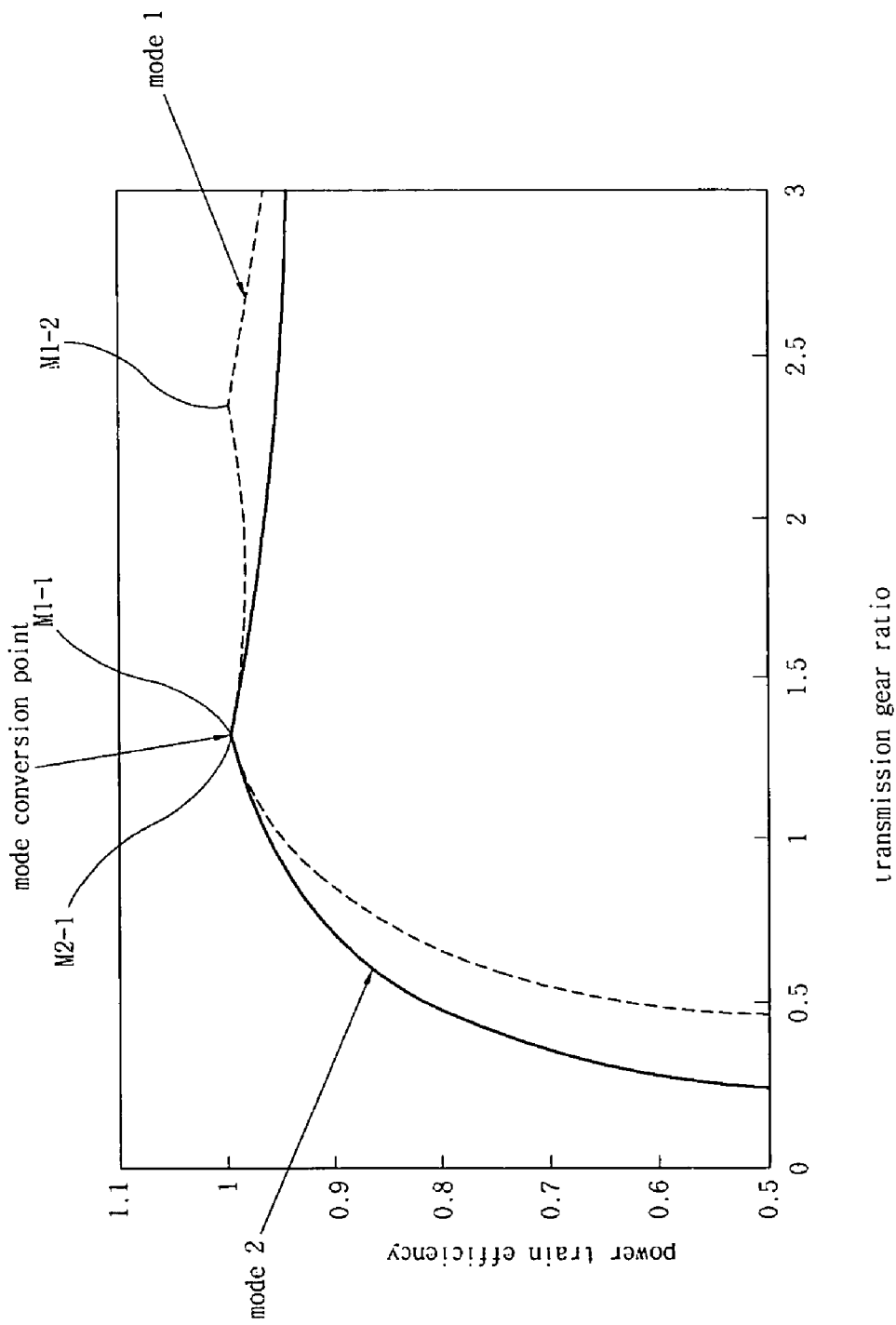
FIG. 14 is a graph showing the efficiency of the power train as a function of transmission gear ratio according to a method of controlling the power train of a second embodiment.

Referring to FIG. 14, it can be seen that the line that shows the efficiency of the power train in the second mode attains the maximum efficiency value of "1" twice. Furthermore, it can be seen that the positions at which the efficiency of the power train is maximum are the mechanical points M1-1 and M1-2 of the power train in the second mode. In addition, it will be understood that the mechanical point M1-2 is in the region in which the transmission gear ratio is increased from the position designated as a mode conversion point, so that the efficiency in the first mode is higher than the second mode in the region in which the transmission gear ratio is increased from the mode conversion point, and the efficiency in the first mode is lower than the second mode in the region in which the transmission gear ratio is reduced from the mode conversion point.

Figure 13:
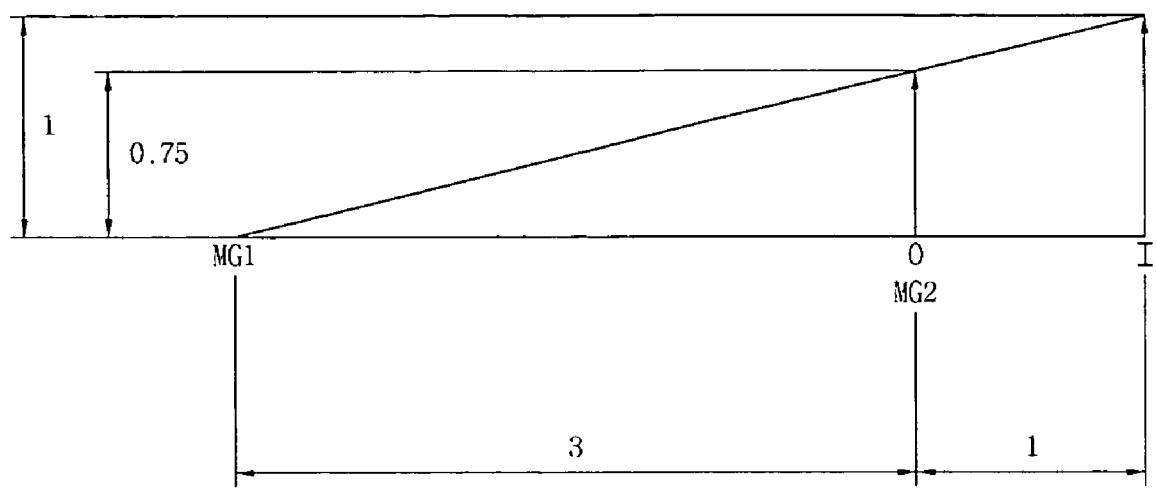
FIG. 13 is a lever analysis diagram showing formation of a mechanical point in the second mode of the power train according to another embodiment of the present invention.

For reference, in FIGS. 12 and 13, the character O denotes output, I denotes input (engine), MG1 denotes the first motor generator, and MG2 denotes the second motor generator. I is spaced apart from O by a unit distance of 1.

When the distance from O to MG1 is $\alpha$ and the distance from O to MG2 is $\beta$, in the case of the first mode, $\alpha=-3$ and $\beta=-0.75$. In the case of the second mode, $\alpha=-3$ and $\beta=0$. As such, it is understood that the first mode is the compound split mode because $\alpha$ and $\beta$ are not zero. In the second mode, $\beta=0$, that is, it is understood that the second mode is the input split mode because the second motor generator 17 is directly coupled to the output shaft. The distances from O to I, MG1 and MG2 correspond to gear ratios in the real power train. The graph of FIG. 14 is defined by Equation. 1, in the same manner as in the first embodiment.

FIG. 13 is a lever analysis diagram of one state of the power train operated in the second mode. FIG. 13 illustrates a transmission gear ratio that forms a mechanical point M2-1 at which the speed of the first motor generator 1 is zero. In this mode, when the speed of the second motor generator 17 is zero, the input is zero, which has no meaning, therefore further explanation and illustration are deemed unnecessary.

Therefore, in the second mode, the one mechanical point M2-1 shown in FIG. 13 is attained while the transmission gear ratio is varied. Supposing that no battery is provided between the first motor generator 1 and the second motor generator 17, that the electricity that is generated at one side is completely consumed by the other side so that the sum of the generated and wasted amounts is zero, and that the energy loss for maintaining the speed of the motor generator at zero is negligible, the efficiency of the power train becomes 1, which is a maximum value, at the mechanical point. This is confirmed in the graph of FIG. 14, which illustrates the efficiency of the power train depending on variation in the transmission gear ratio.

Referring to FIG. 14, it can be seen that the line that shows the efficiency of the power train in the second mode attains the maximum efficiency value of "1" once. Furthermore, it can be seen that the position at which the efficiency of the power train is maximum is the mechanical point M2-1 of the power train in the second mode, and, at the position designated as the mode conversion point, the efficiency of the power train in the first mode is maximum and, simultaneously, the efficiency thereof in the second mode is also maximum, that is, the mechanical points M1-1 and M2-1 are the same. Furthermore, it can be seen that the efficiency in the second mode is higher than the first mode in the left region relative to the mode conversion point. The mode conversion point corresponds to a transmission gear ratio at which the speed of the first motor generator 1 in the first mode becomes zero, and also corresponds to a transmission gear ratio at which the speed of the first motor generator 1 in the second mode becomes zero.

Therefore, in the present invention, on the basis of the mode conversion point, which is the mechanical point at which the speed of the first motor generator 1 is zero, in the region where the transmission gear ratio is higher, the first clutch 25 is engaged and the second clutch 27 is disengaged such that the power train is operated in the first mode. In the region where the transmission gear ratio is lower, the first clutch 25 is disengaged and the second clutch 27 is engaged such that the power train is operated in the second mode.

Thus, the range of the transmission gear ratio within which the efficiency of the power train is superior is increased, so that the power train can maintain a relatively high efficiency even though the transmission gear ratio is varied.

That is, when a relatively high transmission gear ratio is required because the vehicle is moving at a low speed, the power train is operated in the first mode. When a relatively low transmission gear ratio is required because the vehicle is moving at a high speed, the power train is operated in the second mode. In the first mode and the second mode, the first motor generator 1 and the second motor generator 17 alternately conduct charge and discharge depending on the transmission gear ratio of the power train. The power generated by the first or second motor generator 1 or 17 is added to the power of the engine 9 and transmitted to the drive wheel 5.

As is apparent from the foregoing, the present invention provides a power train for hybrid vehicles which increases the range of the transmission gear ratio within which the efficiency of the power train is superior, and in which a method of operating the power train is varied depending on the transmission gear ratio, so that the power train can be operated with superior efficiency.

Furthermore, because the mode which realizes superior efficiency of the power train is selected and the power train is operated in the selected mode, the maximum mechanical load applied to first and second motor generators is reduced. Therefore, the capacity of the motor generator can be reduced and still exhibit the same efficiency.

What is claimed is:

1. A power train having dual modes for hybrid electric vehicles, comprising:
    an engine;
    a first planetary gear set, comprising a first ring gear coupled to the engine;
    a first motor generator coupled to a sun gear of the first planetary gear set;
    a second planetary gear set;
    a first clutch to couple or decouple the first sun gear of the first planetary gear set to or from a second sun gear of the second planetary gear set;
    a second clutch to convert the second sun gear of the second planetary gear set between a stationary state and a rotatable state; and
    a second motor generator, wherein
    a first carrier of the first planetary gear set is coupled to a drive wheel through one operational element of the second planetary gear set, and the second motor generator is coupled to another operational element of the second planetary gear set.

2. The power train as defined in claim 1, wherein the first carrier of the first planetary gear set is coupled to the drive wheel through a second carrier of the second planetary gear set, and the second motor generator is coupled to a second ring gear of the second planetary gear set.

3. The power train as defined in claim 1, wherein the second clutch is provided between a power train case and the second sun gear of the second planetary gear set.

4. The power train as defined in claim 1, wherein each of the first and second planetary gear sets comprises a single pinion planetary gear.

5. The power train as defined in claim 1, wherein the first carrier of the first planetary gear set is coupled to the drive wheel through a second ring gear of the second planetary gear set, and the second motor generator is coupled to a second carrier of the second planetary gear set.

6. A method for controlling the power train of claim 2, wherein, relative to a mechanical point at which a speed of the first motor generator is zero, in a high transmission gear ratio region, the first clutch is disengaged and the second clutch is engaged, and, in a low transmission gear ratio region, the first clutch is engaged and the second clutch is disengaged.

7. A method for controlling the power train of claim 5, wherein, relative to a mechanical point at which a speed of the first motor generator is zero, in a high transmission gear ratio region, the first clutch is engaged and the second clutch is disengaged, and, in a low transmission gear ratio region, the first clutch is disengaged and the second clutch is engaged.

* * * * *